(12) United States Patent
Payne

(10) Patent No.: US 10,139,469 B1
(45) Date of Patent: Nov. 27, 2018

(54) UNDERWATER HOMING SYSTEM

(71) Applicant: Darren Payne, Niceville, FL (US)

(72) Inventor: Darren Payne, Niceville, FL (US)

(*) Notice: Subject to any disclaimer, the term of this patent is extended or adjusted under 35 U.S.C. 154(b) by 417 days.

(21) Appl. No.: 14/306,369

(22) Filed: Jun. 17, 2014

(51) Int. Cl.
*G01S 1/72* (2006.01)
*G01S 3/802* (2006.01)

(52) U.S. Cl.
CPC ............ *G01S 1/725* (2013.01); *G01S 3/802* (2013.01)

(58) Field of Classification Search
CPC ........ G01S 1/725; G01S 3/802; H04W 4/008; H04W 4/02; H04W 4/005; H04W 4/023; H04W 4/027; H04W 4/028; H04W 64/003; H04W 68/02; H04W 76/021; H04W 84/12; H04W 88/08; G01C 21/3697; G01C 21/34; G01C 21/36; G01C 22/006
USPC .......................................................... 367/118
See application file for complete search history.

(56) References Cited

U.S. PATENT DOCUMENTS

| | | | |
|---|---|---|---|
| 3,005,183 A | 10/1961 | Mayes | |
| 3,444,508 A * | 5/1969 | Granfors | B06B 1/0633 367/126 |
| 3,489,993 A * | 1/1970 | Massa, Jr. | G01S 1/725 367/120 |
| 3,986,161 A * | 10/1976 | MacKellar | G01S 3/801 367/118 |
| 5,214,618 A * | 5/1993 | Bugiel | F42B 12/10 367/120 |
| 5,303,206 A | 4/1994 | Bemb | |
| 5,666,326 A | 9/1997 | Holzschuh | |
| 6,029,515 A | 2/2000 | Lahteenmaki | |
| 6,941,226 B2 * | 9/2005 | Estep | G01S 5/0063 367/131 |
| D519,101 S | 4/2006 | Alwicker | |
| 7,969,822 B2 | 6/2011 | Basilico | |
| 2004/0068371 A1 * | 4/2004 | Estep | G01S 5/0063 701/468 |
| 2006/0047428 A1 * | 3/2006 | Adams | G01C 21/16 701/300 |

FOREIGN PATENT DOCUMENTS

DE 19649173 6/1997

* cited by examiner

*Primary Examiner* — Luke Ratcliffe
*Assistant Examiner* — Amie M N'Dure

(57) ABSTRACT

The ultrasonic homing assembly includes a base unit that may be coupled to a boat anchor. A base processor is coupled to the base unit. A transmitter is coupled to the base unit. The transmitter is operationally coupled to the processor. The transmitter transmits a location signal. A remote unit may be worn by a diver. A remote processor is coupled to the remote unit. A receiver is coupled to the remote unit. The receiver is operationally coupled to the remote processor. The receiver receives the location signal from the transmitter. A display is coupled to the remote unit. The display is operationally coupled to the processor. The display directs the diver toward the base unit. The diver swims toward the boat anchor.

16 Claims, 3 Drawing Sheets

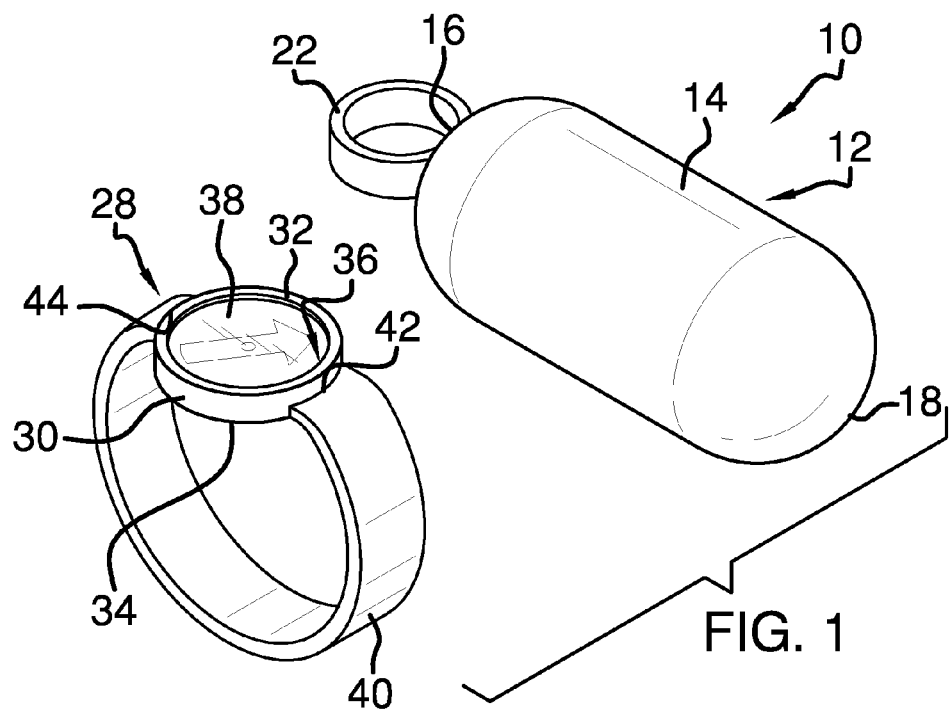
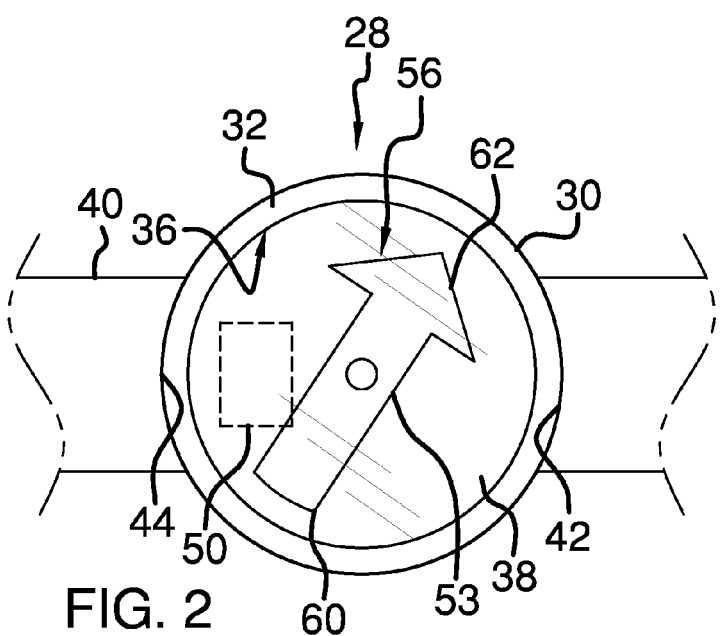

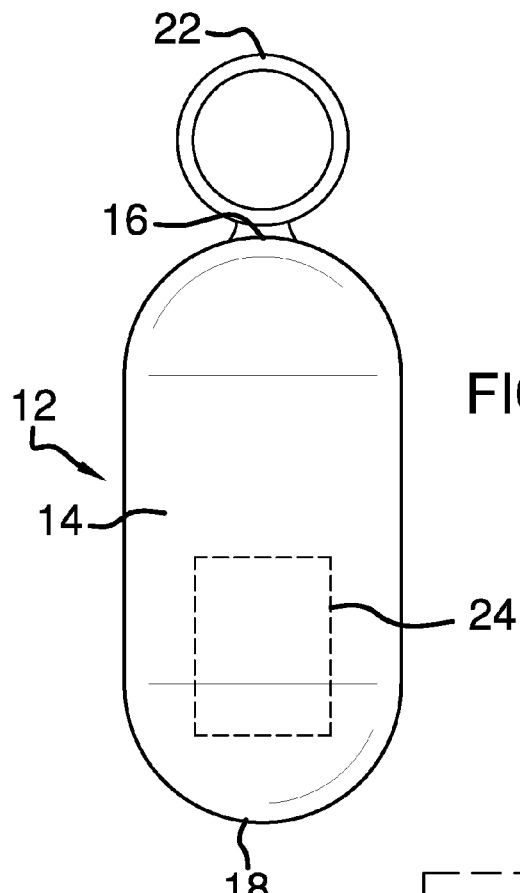
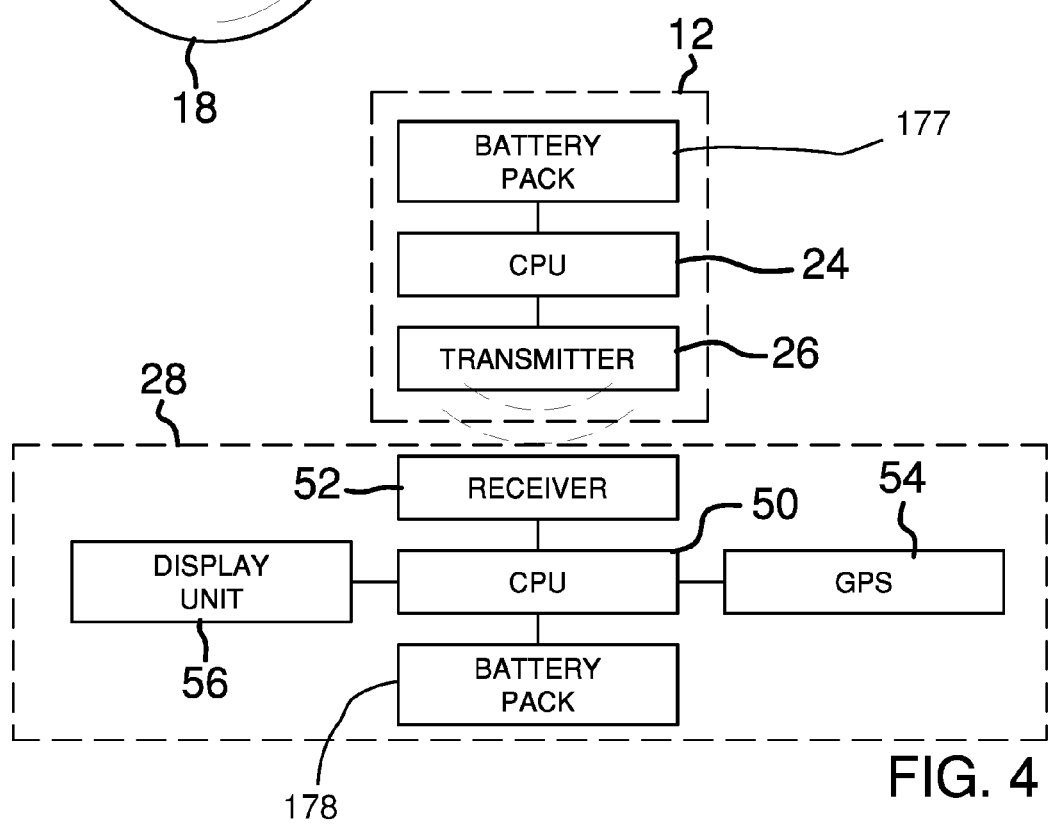

UNDERWATER HOMING SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of homing systems, more specifically, underwater homing systems.

SUMMARY OF THE INVENTION

An embodiment of the disclosure meets the needs presented above by generally comprising a base unit that may be coupled to a boat anchor. A base processor is coupled to the base unit. A transmitter is coupled to the base unit. The transmitter is operationally coupled to the processor. The transmitter transmits a location signal. A remote unit may be worn by a diver. A remote processor is coupled to the remote unit. A receiver is coupled to the remote unit. The receiver is operationally coupled to the remote processor. The receiver receives the location signal from the transmitter. A display is coupled to the processor. The display directs the diver toward the base unit. The diver swims toward the boat anchor.

An object of the invention is to provide a device that is underwater homing system.

These together with additional objects, features and advantages of the underwater homing system will be readily apparent to those of ordinary skill in the art upon reading the following detailed description of presently preferred, but nonetheless illustrative, embodiments of the underwater homing system when taken in conjunction with the accompanying drawings.

In this respect, before explaining the current embodiments of the underwater homing system in detail, it is to be understood that the underwater homing system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the underwater homing system.

It is therefore important that the claims be regarded as including such equivalent construction insofar as they do not depart from the spirit and scope of the underwater homing system. It is also to be understood that the phraseology and terminology employed herein are for purposes of description and should not be regarded as limiting.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 1 is a perspective view of a ultrasonic homing assembly according to an embodiment of the disclosure.

FIG. 2 is a top view of an embodiment of the disclosure.

FIG. 3 is a right side view of an embodiment of the disclosure.

FIG. 4 is a schematic view of an embodiment of the disclosure.

DETAILED DESCRIPTION OF THE EMBODIMENT

Figure 5:
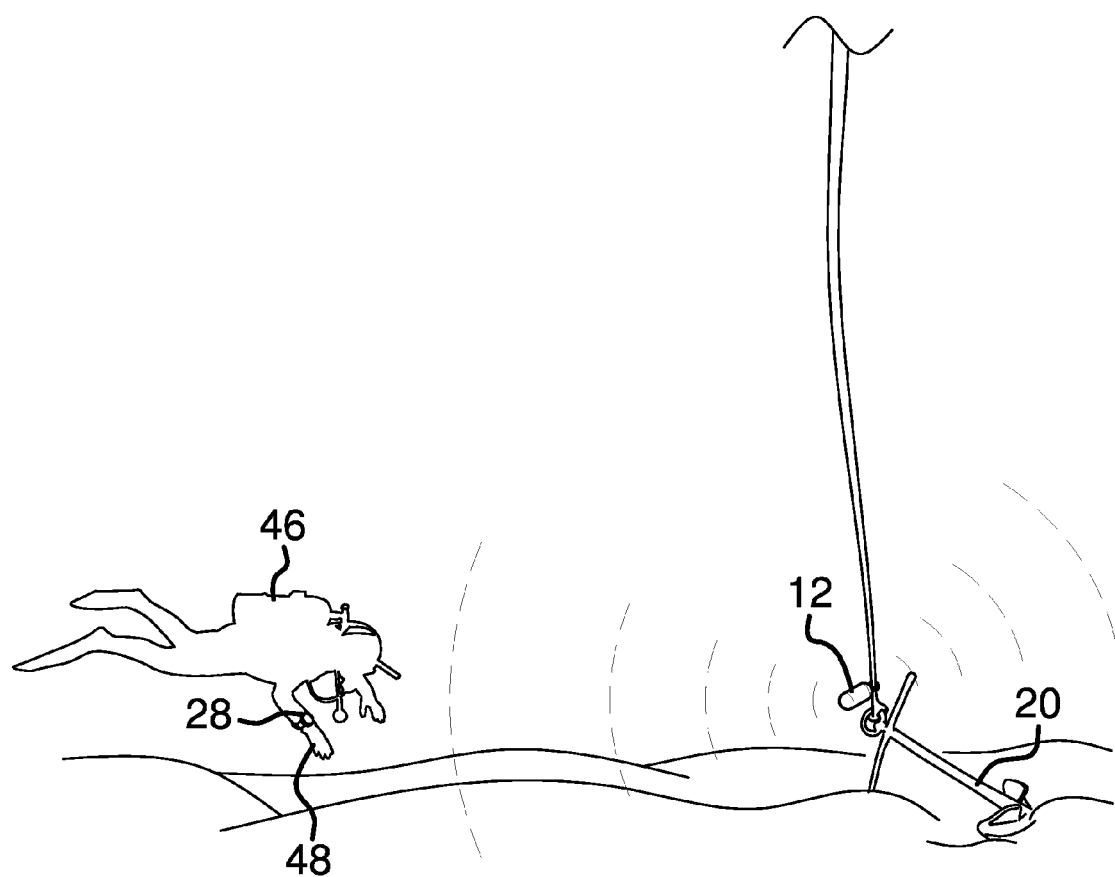
FIG. 5 is an in-use view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

As best illustrated in FIGS. 1 through 5, the ultrasonic homing assembly 10 generally comprises a base unit 12. The base unit 12 has an outer wall 14 extending between a first end 16 and a second end 18 of the base unit 12. The outer wall 14 of the base unit 12 is curvilinear so the base unit 12 has a cylindrical shape. Each of the first 16 and second 18 ends of the base unit 12 are rounded. The base unit 12 may be coupled to a boat anchor 20.

A ring 22 is coupled to the first end 16 of the base unit 12. The ring 22 is coupled to the boat anchor 20. The base unit 12 is retained on the boat anchor 20.

A base processor 24 is coupled to the base unit 12. The base processor 24 may be an electronic processor of any conventional design. A transmitter 26 is coupled to the base unit 12. The transmitter 26 is electrically coupled to the base processor 24. Additionally, the transmitter 26 transmits an ultrasonic signal. The ultrasonic signal may have a frequency between 1 MHz and 3 MHz.

A remote unit 28 is provided. The remote unit 28 has an outer edge 30 extending between each of a top side 32 and a bottom side 34 of the remote unit 28. The outer edge 30 of the remote unit 28 is curved. Moreover, the remote unit 28 has a circular shape. The top side 32 of the remote unit 28 has a display well 36 extending downwardly therein. A window 38 is coupled to the top side 32 of the remote unit 28. The window 38 completely covers the display well 36.

A strap 40 has a primary end 42 and a secondary end 44. Each of the primary 42 and secondary 44 ends of the strap 40 are coupled to opposite sides of the outer edge 30 of the remote unit 28. A diver 46 places the strap 40 around the diver's wrist 48. The remote unit 28 is retained on the diver 46. Additionally, the remote unit 28 may be comprised of a fluid impermeable material.

A remote processor 50 is coupled to the remote unit 28. The remote processor 50 may be an electronic processor of any conventional design. A receiver 52 is coupled to the remote unit 28. The receiver 52 is electrically coupled to the remote processor 50. Additionally, the receiver 52 receives the location signal from the transmitter 26. The receiver 52 may be an ultrasonic receiver of any conventional design. The remote unit 28 is couple to a remote power supply 178. The remote power supply 178 is electrically coupled to said remote processor 50. The remote power supply 178 comprises the use of at least one battery. A base power supply 177 is coupled to said base unit 12. The base power supply 177 is electrically coupled to said base processor 24. The base power supply 177 comprises the use of at least one battery.

A display 56 is coupled to the remote unit 28. The display 56 is electrically coupled to the remote processor 50. Moreover, the display 56 comprises an arrow 58. The arrow 58 has a flat end 60 and a pointed end 62.

The arrow 58 is rotatably coupled to the top side 32 of the remote unit 28. Moreover, the arrow 58 is positioned within the display well 36. The arrow 58 is rotated by the remote processor 50 so the pointed end 62 of the arrow 58 points in the direction of the base unit 12. The diver 40 swims toward the boat anchor 20.

In use, the diver 40 wears the remote unit 28 when the diver 40 is underwater. The diver 40 observes the arrow 58 on the remote unit 28. The arrow 58 guides the diver 40 back to the boat anchor 20 when the diver 40 wishes to return to the boat anchor 20. The assembly 10 allows the diver 40 to safely return to the boat anchor 20 regardless of visibility or other diving conditions.

With respect to the above description, it is to be realized that the optimum dimensional relationship for the various components of the ultrasonic homing assembly 10, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the ultrasonic homing assembly 10.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An ultrasonic homing assembly configured to direct a diver toward a boat anchor, said assembly comprising:
   a base unit configured to be coupled to the boat anchor;
   a base processor coupled to said base unit;
   a transmitter coupled to said base unit, said transmitter being operationally coupled to said processor, said transmitter transmitting a location signal;
   a remote unit configured to be worn by the diver;
   a remote processor coupled to said remote unit;
   a receiver coupled to said remote unit, said receiver being operationally coupled to said remote processor, said receiver receiving said location signal from said transmitter;
   a display coupled to said remote unit, said display being operationally coupled to said processor, said display directing the diver toward said base unit such that the diver swims toward the boat anchor;
   wherein a ring coupled to a first end of said base unit, said ring being coupled to the boat anchor such that said base unit is retained on the boat anchor.

2. The assembly according to claim 1, wherein said base unit having an outer wall extending between a first end and a second end of said base unit, said outer wall of said base unit being curvilinear such that said base unit has a cylindrical shape.

3. The assembly according to claim 1, wherein said transmitter being electrically coupled to said remote processor.

4. The assembly according to claim 1, wherein said transmitter emitting an ultrasonic signal.

5. The assembly according to claim 1, wherein said remote unit having an outer edge extending between each of a top side and a bottom side of said remote unit, said outer edge of said remote unit being curved such that said remote unit has a circular shape.

6. The assembly according to claim 1, wherein a strap having a primary end and a secondary end.

7. The assembly according to claim 6, wherein each of said primary and secondary ends of said strap being coupled to opposite sides of an outer edge of said remote unit, the diver placing said strap around the diver's wrist such that said remote unit is retained on the diver.

8. The assembly according to claim 1, wherein said receiver being electrically coupled to said base processor.

9. The assembly according to claim 1, wherein a top side of said remote unit having a display well extending downwardly therein.

10. The assembly according to claim 1, wherein a GPS coupled to said remote unit.

11. The assembly according to claim 10, wherein said GPS being electrically coupled to said remote processor such that said GPS determines a location of said remote unit with respect to said base unit.

12. The assembly according to claim 1, wherein:
    said display being electrically coupled to said remote processor;
    said display comprising an arrow having a flat end and a pointed end;
    said arrow being rotatably coupled to a top side of said remote unit such that said arrow is positioned within a display well; and
    said arrow being rotated by said remote processor such that said pointed end of said arrow points in the direction of said base unit.

13. The assembly according to claim 1, wherein:
    a remote power supply coupled to said remote unit;
    said remote power supply being electrically coupled to said remote processor; and
    said remote power supply comprising at least one battery.

14. The assembly according to claim 1, wherein:
    a base power supply coupled to said base unit;
    said base power supply being electrically coupled to said base processor; and
    said base power supply comprising at least one battery.

15. An ultrasonic homing assembly configured to direct a diver toward a boat anchor, said assembly comprising:
    a base having an outer wall extending between a first end and a second end of said base unit, said outer wall of said base unit being curvilinear such that said base unit has a cylindrical shape, said base unit being configured to be coupled to the boat anchor;
    a base processor coupled to said base unit;

a transmitter coupled to said base unit, said transmitter being operationally coupled to said processor, said transmitter transmitting a location signal;

a remote unit configured to be worn by the diver;

a remote processor coupled to said remote unit;

a receiver coupled to said remote unit, said receiver being operationally coupled to said remote processor, said receiver receiving said location signal from said transmitter;

a display coupled to said remote unit, said display being operationally coupled to said processor, said display directing the diver toward said base unit such that the diver swims toward the boat anchor;

wherein a ring coupled to a first end of said base unit; said ring being coupled to the boat anchor such that said base unit is retained on the boat anchor;

said transmitter being electrically coupled to said remote processor;

said transmitter emitting an ultrasonic signal;

wherein said remote unit having an outer edge extending between each of a top side and a bottom side of said remote unit;

said outer edge of said remote unit being curved such that said remote unit has a circular shape;

a strap having a primary end and a secondary end;

each of said primary and secondary ends of said strap being coupled to opposite sides of an outer edge of said remote unit, the diver placing said strap around the diver's wrist such that said remote unit is retained on the diver;

said receiver being electrically coupled to said base processor;

a top side of said remote unit having a display well extending downwardly therein;

wherein a GPS coupled to said remote unit;

said GPS being electrically coupled to said remote processor such that said GPS determines a location of said remote unit with respect to said base unit;

said display being electrically coupled to said remote processor;

said display comprising an arrow having a flat end and a pointed end;

said arrow being rotatably coupled to a top side of said remote unit such that said arrow is positioned within a display well;

said arrow being rotated by said remote processor such that said pointed end of said arrow points in the direction of said base unit.

16. The assembly according to claim 15, wherein a remote power supply coupled to said remote unit; said remote power supply being electrically coupled to said remote processor; said remote power supply comprising at least one battery; a base power supply coupled to said base unit; said base power supply being electrically coupled to said base processor; said base power supply comprising at least one battery.

* * * * *